United States Patent
Jeong et al.

(10) Patent No.: US 10,216,340 B2
(45) Date of Patent: Feb. 26, 2019

(54) TOUCH DETECTION DEVICE FOR IMPROVING TOUCH DETECTION AND VISIBILITY AND ELECTRONIC DEVICE COMPRISING SAME

(71) Applicant: CRUCIALTEC CO., LTD., Chungcheongnam-do (KR)

(72) Inventors: Ick Chan Jeong, Gyeonggi-do (KR); Jun Yun Kim, Gyeonggi-do (KR)

(73) Assignee: CRUCIALTEC CO., LTD., Chungcheongnam-do (KR)

( * ) Notice: Subject to any disclaimer, the term of this patent is extended or adjusted under 35 U.S.C. 154(b) by 335 days.

(21) Appl. No.: 14/912,785

(22) PCT Filed: Jun. 27, 2014

(86) PCT No.: PCT/KR2014/005731
§ 371 (c)(1),
(2) Date: Apr. 19, 2016

(87) PCT Pub. No.: WO2015/030360
PCT Pub. Date: Mar. 5, 2015

(65) Prior Publication Data
US 2016/0239120 A1    Aug. 18, 2016

(30) Foreign Application Priority Data

Aug. 30, 2013 (KR) .................. 10-2013-0104346

(51) Int. Cl.
*G06F 3/044* (2006.01)
*G06F 3/041* (2006.01)
(52) U.S. Cl.
CPC ............ *G06F 3/044* (2013.01); *G06F 3/0412* (2013.01); *G06F 2203/04103* (2013.01); *G06F 2203/04112* (2013.01)

(58) Field of Classification Search
CPC ........ G06F 3/041; G06F 3/0412; G06F 3/044; G06F 2203/04103; G06F 2203/04107; G06F 2203/04111–2203/04112
See application file for complete search history.

(56) References Cited

U.S. PATENT DOCUMENTS 9,018,536 B2 *  4/2015  Ullmann ............. B32B 38/0012
                                                            174/257
9,459,744 B2 * 10/2016  Hirata .................... G06F 3/044
(Continued)

FOREIGN PATENT DOCUMENTS

JP         11110115 A      4/1999
KR     1020110051208 A     5/2011
(Continued)

OTHER PUBLICATIONS

International Search Report in International Application No. PCT/KR2014/005731, filed Jun. 27, 2014.

*Primary Examiner* — David Tung
(74) *Attorney, Agent, or Firm* — Plumsea Law Group, LLC

(57) ABSTRACT

One embodiment of the present invention provides a touch detection device comprising: a plurality of sensor pads disposed to form a plurality of rows and columns and forming a touch capacitance with a touch input tool; and a plurality of signal wirings for respectively connecting the plurality of sensor pads to a driving device, wherein at least one side of each of the plurality of sensor pads and at least one of the plurality of signal wirings include a plurality of segments forming an acute angle with a straight line parallel to the column direction.

6 Claims, 12 Drawing Sheets

(56) References Cited

U.S. PATENT DOCUMENTS

| | | | | |
|---|---|---|---|---|
| 2009/0267916 A1* | 10/2009 | Hotelling | ............... | G06F 3/044 |
| | | | | 345/174 |
| 2013/0082719 A1* | 4/2013 | Prendergast | ............ | G06F 3/044 |
| | | | | 324/658 |
| 2013/0222297 A1* | 8/2013 | Adachi | ................... | G06F 3/041 |
| | | | | 345/173 |
| 2014/0225839 A1* | 8/2014 | Dunphy | ................ | G06F 3/0412 |
| | | | | 345/173 |
| 2014/0292710 A1* | 10/2014 | Koito | ...................... | G06F 3/044 |
| | | | | 345/174 |
| 2014/0360856 A1* | 12/2014 | Mizumoto | ............. | G06F 3/044 |
| | | | | 200/600 |

FOREIGN PATENT DOCUMENTS

| KR | 1020120083692 A | 7/2012 |
|---|---|---|
| WO | WO-2013039050 A1 | 3/2013 |

\* cited by examiner (a)

(b)

(c)

(a)

(b)

TOUCH DETECTION DEVICE FOR IMPROVING TOUCH DETECTION AND VISIBILITY AND ELECTRONIC DEVICE COMPRISING SAME

CROSS-REFERENCE TO RELATED APPLICATIONS

This application is the U.S. national stage application of International Patent Application No. PCT/KR2014/005731, filed Jun. 27, 2014, which claims priority to Korean Application No. 10-2013-0104346, filed Aug. 30, 2013, the disclosures of each of which are incorporated herein by reference in their entirety.

TECHNICAL FIELD

The present invention relates to a touch detection device and an electronic device comprising the same, and more specifically to a touch detection device for improving touch detection and visibility wherein at least one side of a sensor pad includes at least one segment forming an acute angle with the column direction and an electronic device comprising the same.

BACKGROUND ART

A touchscreen panel, which is a device for inputting user's commands by touching letters or figures displayed on the screen of an image display device with a human finger or other touch means, is generally attached to an image display device. The touchscreen panel converts the touch location into electrical signals. The electrical signals are used as input signals.

Known methods for implementing a touchscreen panel include a resistive-type method, a photo-sensitive method, and a capacitance method. The touch panel with the capacitance method senses the change in capacitance formed by a conductive sensing pattern with another peripheral sensing pattern or ground electrode, etc., when a finger or object makes contact, and converts a contact location into an electrical signal.

FIG. 1 is an exploded plan view illustrating an example of a capacitive touch screen panel.

Referring to FIG. 1, a touchscreen panel 10 includes a transparent substrate 12, and a first sensor pattern layer 13, a first insulating layer 14, a second sensor pattern layer 15, and a second insulating layer 16 formed in order on the transparent substrate 12, and metal wiring 17.

The first sensor pattern layer 13 may be connected along the lateral direction on the transparent substrate 12, and may be connected with the metal wiring 17 in the unit of rows.

The second sensor pattern layer 15 may be connected along the column direction on the first insulating layer 14, and disposed alternately with the first sensor pattern layer 13 so as not to overlap with the first sensor pattern layer 13. Also, the second sensor pattern layer 15 is connected with the metal wiring 17 in the unit of columns.

When a human finger or touch means touches the touchscreen panel 10, the change in capacitance according to touch location is delivered to the driving circuit through the first and second sensor pattern layers 13 and 15, and metal wiring 17. Also, the touch location is identified as the change in capacitance thus-delivered is converted into an electrical signal.

However, each sensor pattern layer 13 and 15 of the touchscreen panel 10 should have a pattern made of transparent conductive materials such as indium-tin oxide (ITO), separately, and include an insulating layer 14 between the sensor pattern layers 13 and 15, which results in an increase in thickness.

Also, since touch detection is possible only after accumulating the capacitance changes minutely generated by touch several times, the capacitance change have to be detected with high frequency. Further, in order to sufficiently accumulate change in capacitance within a predetermined time, metal wiring for maintaining low resistance is required. Such metal wiring makes the bezel at the edge of the touchscreen thick and causes an additional mask process.

In order to solve this problem, a touch detection device was suggested as illustrated in FIG. 2.

The touch detection device illustrated in FIG. 2 includes a touch panel 20, a driving device 30, and a circuit board 40 connecting them.

The touch panel 20 is formed on a substrate 21, and includes a plurality of sensor pads 22 arranged in the form of polygonal matrix, and a plurality of signal wirings 23 connected with the sensor pads 22, respectively.

For each signal wiring 23, one end is connected with the sensor pad 22 and the other end extends to the bottom edge of the substrate 21. The sensor pad 22 and signal wiring 23 may be patterned on a cover glass 50.

The driving device 30 selects the sensor pads 22 one at a time, and measures the capacitance of the corresponding sensor pad 22. Accordingly, it detects whether touch is occurred.

Meanwhile, the touch detection device may be laminated on a display device or may be built-in. The display device may include a backlight, a polarizing plate, a substrate, a liquid crystal layer, a pixel layer 60, etc. Among them, a pixel layer 60 will be explained with regard to an embodiment of the present invention.

The pixel layer 60 is a color filter formed on a surface (a top surface or a bottom surface) of the liquid crystal layer for displaying an image. Colors may be implemented in a liquid crystal display with a pixel unit of red, green and blue (hereinafter, referred to as R, G and B). In this case, the pixel layer 60 includes a plurality of pixels including sub-pixels of R, G and B. Here, the liquid crystal layer includes an upper substrate, a lower substrate and liquid crystal, and generates contrast by modulating light (e.g., arrows illustrated in FIG. 2) from the back light to display the image.

As illustrated in FIG. 2, in the touch screen panel 20, each signal wiring 23 is arranged with a structure being connected to the bottom edge of the substrate 21, which makes deviation in a gap between the sensor pad 22 and the signal wiring 23. For example, in the case of the sensor pads located uppermost, since each signal wiring is arranged to be connected downwardly, the gap between the sensor pad and the signal wiring is wide. In comparison, in the case of the sensor pads located lowermost, the signal wirings connected to the sensor pads located in the top are arranged in areas adjacent to each other, and thus the gap between the sensor pad and the signal wiring becomes relatively narrow compared to the sensor pads located in the top.

That is, the gap between the sensor pad 22 and the signal wiring 23 may be different. Due to this deviation, there are problems in that scattered reflectivity of light emitted from a backlight varies depending on an area, and a difference in gap between the sensor pad 22 and signal wiring 23 may be stood out from outside.

FIG. 3 is an enlarged view illustrating a part of top surface of a conventional touch display device. In this case, FIG. 3 selects the pixel layer 60 and signal wiring 23 from the structure where the touch detection device is laminated, illustrated in FIG. 2, and enlarges the top surface overlapping the two constituents.

As illustrated in FIG. 3, the signal wiring 23 arranged in the same form as in FIG. 2 overlaps with the pixels arranged in the matrix form of the pixel layer 60 to be parallel to the column direction. In the case of pixel 'A' including sub-pixels of R, G and B, the signal wiring 23 overlaps a part of sub-pixel R and all of sub-pixel G in the column direction.

Although each signal wiring 23 in FIG. 3 is illustrated to overlap with a part of sub-pixel R and all of sub-pixel G, actually, there is a difference in gap between the signal wirings 23 according to the arrangement location (e.g., top or bottom). Thus, it is of course that areas of sub-pixels of R, G and B overlapping with the signal wiring 23 are different for each pixel. For example, when a specific signal wiring overlaps with a part of sub-pixel R and all of sub-pixel G, but another signal wiring overlaps with a part of sub-pixel G and all of sub-pixel of B, the portion overlapped by the signal wiring and the portion not overlapped by the signal wiring are different for each pixel, and thus the area of sub-pixels of R, G and B overlapping with the signal wiring 23 becomes different, either.

Due to this, each pixel differs from each other in terms of color temperature which each pixel generates according to light transmittance of the signal wiring 23 overlapped on each pixel. Accordingly, a difference in the sense of color is generated at any location. This causes a problem in that a pattern may be recognized with naked eyes due to a rainbow effect or Moire phenomenon of being scattered into rainbow light in all or a part of the touch panel.

DETAILED DESCRIPTION OF THE INVENTION

Technical Subject

The present invention is to solve the above problems of conventional art.

Also, it is an object of the present invention to improve visibility of a touch screen panel by configuring a plurality of signal wirings which connect each sensor pad with a driving device and at least one side of each sensor pad with at least one segment forming an acute angle with the pixel arrangement direction of a display.

It is another object of the present invention to remove the differences in pattern and light transmittance between the area forming the sensor pad and the area forming the signal wiring.

It is yet another object of the present invention to allow the display device not to have the difference in the sense of color in the corresponding unit areas, in the case of separately setting the unit area for the area covered by the sensor pad or signal wiring and the area not covered.

Means for Solving Technical Subject

According to an embodiment of the present invention for achieving the above objects, a touch detection device, which includes a plurality of sensor pads disposed so as to form a plurality of rows and columns to form a touch capacitance with a touch input tool; and a plurality of signal wirings which connect each of the plurality of sensor pads to the driving device, wherein at least one side of each of the plurality of sensor pads and at least one of each of the plurality of signal wirings include at least one segment forming an acute angle with a straight line parallel to the column direction, is provided.

The at least one segment includes a first segment and a second segment. The first segment and the second segment meet each other to form a protruding part to the outside of the sensor pad or a concave part to the inside of the sensor pad.

The first segment and the second segment may have the same acute angle formed with respect to the straight line parallel to the column direction.

Each of the sensor pads is spaced away from each other at predetermined intervals, and a plurality of slits forming an acute angle with the straight line may be formed.

The pitch of the slit may be formed to be identical to the gap between the signal wirings.

The areas separated by the slit in the sensor pad may be electrically connected to each other through at least one bridge formed in the area in the sensor pad.

The plurality of slits may become bigger or smaller in size as they go to an edge of the sensor pad from the center of the sensor pad.

The plurality of sensor pads and the plurality of signal wirings may be formed of transparent conductive materials.

The touch detection device is laminated on the display device including a plurality of pixels or is built-in. Additionally, the plurality of segments forming the acute angle with the straight line in the column direction may form an acute angle so as not to be parallel to the longitudinal direction of the pixel.

Meanwhile, according to another embodiment of the present invention, an electronic device, which includes a display device arranged to have a plurality of rows and columns and including a plurality of pixels consisting of a plurality of sub-pixels; and a touch screen panel including a plurality of sensor pads arranged in the top of the display device and arranged to have a plurality of rows and columns, and a plurality of signal wirings which connect each of the sensor pads to a driving device, wherein a first area where the sensor pad or the signal wiring of the touch screen panel is arranged consists of the plurality of unit areas set for quantity of light or luminance of the plurality of sub-pixels to be uniformly distributed in the unit area, is provided.

The electronic device further includes a second area where the sensor pad or signal wiring of the touch screen panel is not arranged. The second area may consist of the plurality of unit areas.

The unit area of the first area and the unit area of the second area may be set to have the same form.

The sum of size of the sub-pixels with the same properties in the unit area may be equivalent to each other.

The properties may be red, green and blue.

The number of sections occupied by the sub-pixels in the unit area may be at least 4.

Effect of the Invention

According to an embodiment of the present invention, at least one side of each of the sensor pads includes a plurality of segments forming an acute angle with the pixel arrangement direction of the display, thereby improving visibility of the touch screen panel.

According to an embodiment of the present invention, a slit is formed in each sensor pad, and the pitch of the slit is configured to be the same as that of the area between the signal wirings, thereby removing the differences in pattern and light transmittance between the area formed by the sensor pad and the area formed by the signal wiring.

According to an embodiment of the present invention, in a display device, in the case of setting separate unit areas for the area covered by the sensor pad or signal wiring or the area not covered, the areas occupied by sub-pixels of R, G and B in the corresponding unit area may be equivalent to each other, and accordingly the difference in the sense of color between the areas may be removed.

The effect of the present invention is not limited to the above-mentioned effects. It should be construed that the effect of the present invention includes all effects which can be inferred from the constitution of invention described in the detailed description or claims of the present invention.

DETAILED DESCRIPTION

Figure 1:
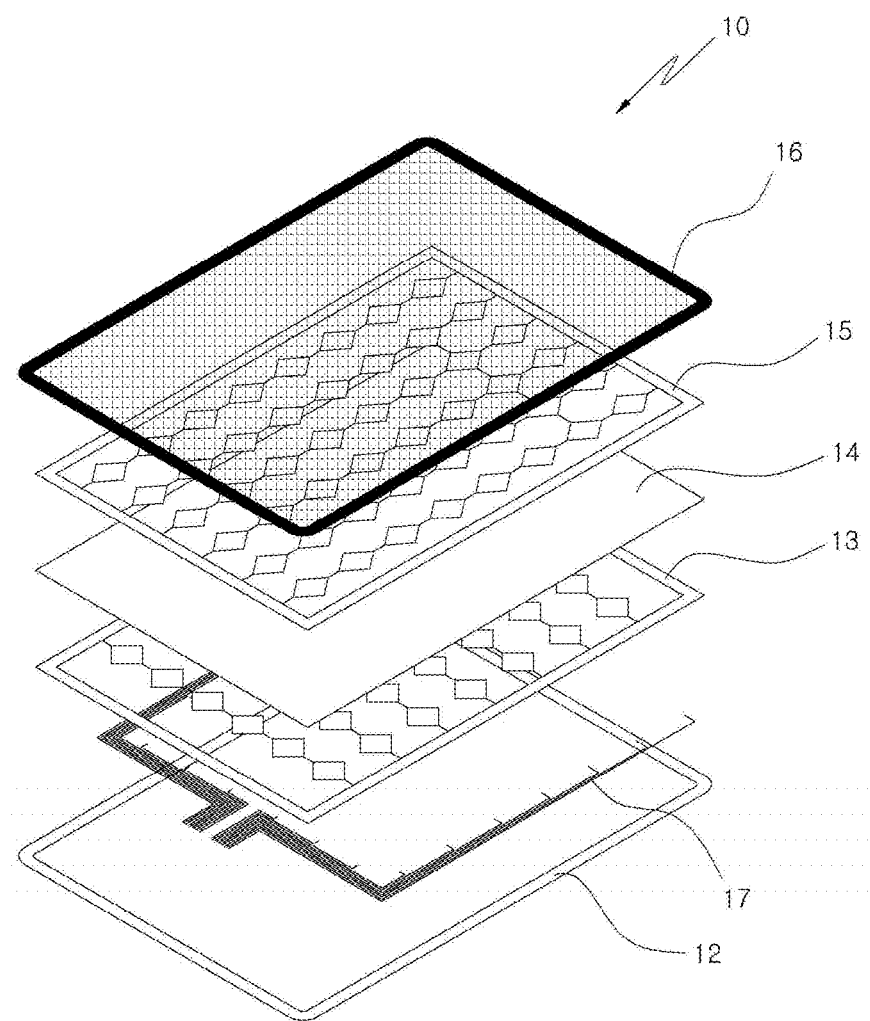
FIG. 1 is an exploded plan view of an example of a capacitive touch screen panel.

Hereinafter, the present invention will be explained with reference to the accompanying drawings. The present invention, however, may be modified in various different ways, and should not be construed as limited to the embodiments set forth herein. Also, in order to clearly explain the present disclosure, portions that are not related to the present disclosure are omitted, and like reference numerals are used to refer to like elements throughout.

Throughout the specification, it will be understood that when an element is referred to as being "connected to" another element, it may be "directly connected to" the other element, or intervening elements or layers may be present. In addition, it will also be understood that when a component "includes" an element, unless stated otherwise, it should be understood that the component may include other elements.

Hereinafter, examples of the present invention will be explained in detail with reference to the accompanying drawings.

The embodiment of the present invention is related to improving visibility of a touch screen panel by configuring such that a plurality of signal wirings which connect each of a plurality of sensor pads to a driving device, and at least one side of each sensor pads includes at least one segment forming an acute angle with a pixel arrangement direction of the display device, when the touch detection device is laminated on the display device including a plurality of pixels or is built-in.

Figure 4:
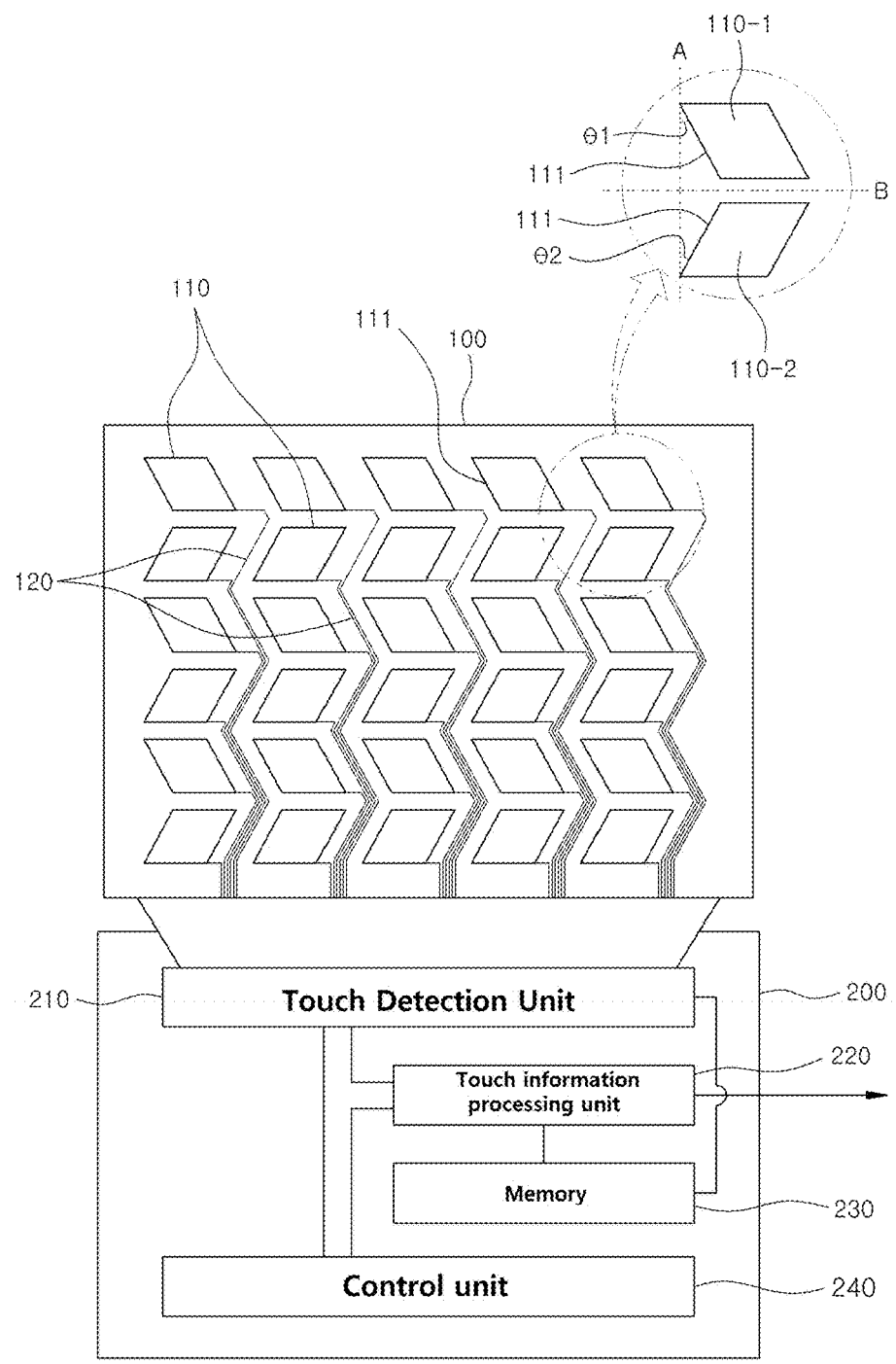
FIG. 4 is an exploded plan view of a touch detection device according to an embodiment of the present invention.

FIG. 4 is a view illustrating a touch detection device including a signal wiring and a sensor pad applying the improved method.

Referring to FIG. 4, the touch detection device includes a touch screen panel 100 and a driving device 200.

The touch screen panel 100 may include a plurality of sensor pads 110 arranged to have a plurality of rows and columns. The plurality of sensor pads 110 may have polygonal forms, and may be arranged in the form of matrix.

In order to detect touch input, each sensor pad 110 forms, as an electrode patterned on the substrate, touch capacitance Ct with a touch input tool such as a finger or electrical conductor, to sense the touch. In this case, the touch capacitance Ct is the capacitance formed between the sensor pad 110 and touch input tool when the touch is generated.

The plurality of sensor pads 110 may be formed on the substrate, and each sensor pad 110 may be electrically connected to the driving device 200 through the signal wiring 120. In this case, the signal wiring 110 connects each of the sensor pads to the driving device, and may be extended and bent while forming an acute angle with the pixel arrangement direction of the display device which will be described later. Meanwhile, the substrate may be formed of a glass or a plastic film, etc. made of a transparent material.

At least one side 111 of each of the plurality of sensor pads 110 may consist of a straight line forming an acute angle with the pixel arrangement direction of the display device. For example, as illustrated in FIG. 4, the display device where the pixels are arranged may have a virtual straight line A parallel to the longitudinal direction of a specific pixel and a straight line B orthogonal thereto. The plurality of sensor pads 110 may have a first side and a second side which are vertical to the straight line A, and a third side and a fourth side which are parallel to each other while forming an acute angle with the straight line A.

Additionally, the sensor pads 110-1 and 110-2 adjacent to each other in the column direction may be symmetric with respect to the straight line B parallel to the row direction formed by the sensor pad 110. In this case, one side of the sensor pads adjacent to each other in the column direction may have the same acute angle with respect to the straight line A parallel to the column direction. For example, the acute angle (θ1) formed by one side 111 of the sensor pad 110-1 with respect to the straight line A parallel to the column direction may be identical to the acute angle (θ2) formed by one side 111 of the sensor pad 110-2 adjacent to the sensor pad 110-1 in the same column direction with respect to the straight line A parallel to the column direction.

One end of each signal wiring 120 is connected to the sensor pad 110, and the other end extends to a bottom edge of the substrate 15. A line pitch of the signal wiring 120 may be formed to be considerably narrow from several micrometers to scores of micrometers.

Meanwhile, each signal wiring 120 may be extended and bent to be parallel to one side 111 of sensor pads adjacent to each other. For example, the signal wiring 120 may have forms (e.g., a saw shape) of being extended to be parallel to one side 111 of the sensor pad and bent, and then extended again to be parallel to one side 111 of the sensor pad located on the bottom of the sensor pad.

The sensor pad 110 and the signal wiring 120 may be formed of the same material. For example, when the sensor pad 110 is formed of a transparent conductive material such as indium-tin-oxide (ITO), etc., the signal wiring 120 may also be formed of the same material.

That is, the sensor pad 110 and the signal wiring 120 may be formed of a transparent conductive material, such as ITO, antimony tin oxide (ATO), indium-zinc-oxide (IZO), carbon nanotube (CNT), graphene, etc.

The driving device 200 for driving the touch screen panel 100 may be formed on a circuit substrate such as a printed circuit board or a flexible circuit film, but is not limited thereto. The driving device may be mounted directly on the substrate or a part of a cover glass.

The driving device 200 may include a touch detection unit 210, a touch information processing unit 220, a memory 230, a control unit 240, etc., and may be implemented by at least one integrated circuit (IC) chip. The touch detection unit 210, touch information processing unit 220, memory 230 and control unit 240 may be separated from each other, or may be integrated with at least two constituents to be implemented.

The touch detection unit 210 may include a plurality of switches connected to the plurality of sensor pads 110 and the plurality of signal wirings 120, respectively, and a plurality of capacitance. The touch detection unit 210 receives a driving control signal from the control unit 240 for driving, and outputs a voltage corresponding to a result of touch detection. Additionally, the touch detection unit 210 may further include an amplifier and an analogue-digital converter. Also, the touch detection unit 210 may convert, amplify or digitalize the difference in voltage change of each sensor pad 110 to store the change in the memory 230.

The touch information processing unit 220 processes a digital voltage stored in the memory 230 to create necessary information such as information on whether touch is generated, touch area, and touch coordinates, etc. For example, the touch information processing unit 220 may output a result of comparing an output value outputted from the touch detection unit 210 with the digital voltage stored in the memory 230, in response to the driving control signal of the control unit 240.

The memory 230 memorizes a digital voltage based on the difference in voltage change detected by the touch detection unit 210, and predetermined data used for detecting touch, calculating area, and calculating touch coordinates or real-time data.

The control unit 240 controls the touch detection unit 210 and touch information processing unit 220, and may include a micro control unit (MCU) and perform predetermined signal processing through firmware.

Figure 5:
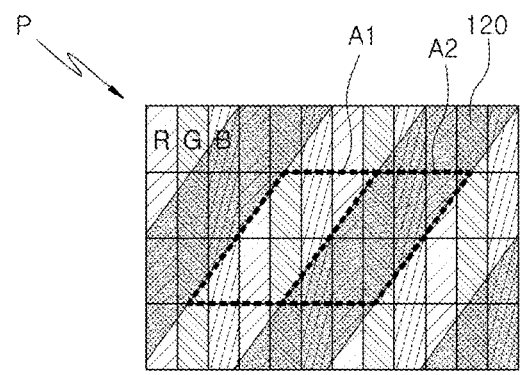
FIG. 5 is a view illustrating a lamination structure of a display device and a touch detection device according to an embodiment of the present invention.
Figure 5:
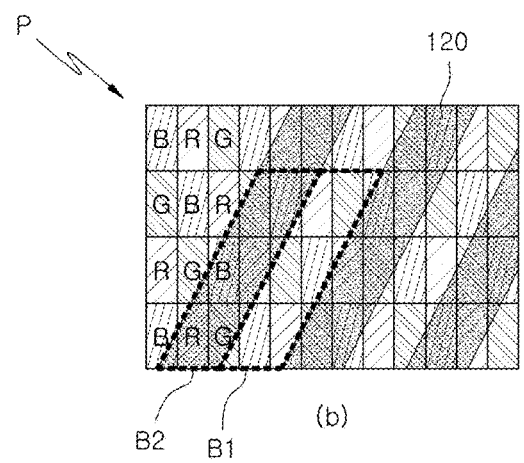
Figure 5:
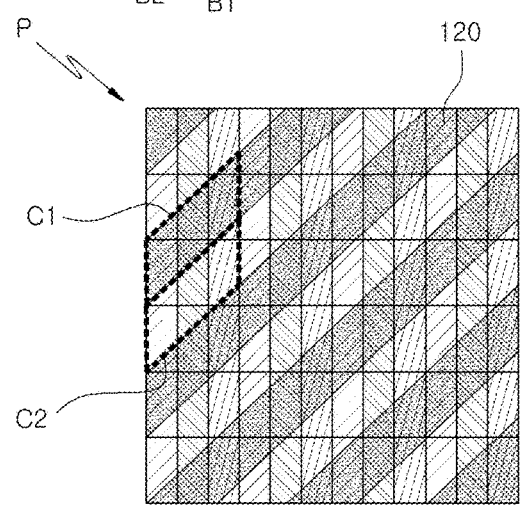

FIG. 5 is a view illustrating signal wirings each of which is connected to the pixel of the display device and the sensor pad of the touch detection device. According to an embodiment of the present invention, the touch screen panel including the sensor pad and signal wiring may be formed on the display device, and this structure may be included in the electronic device.

Referring to FIG. 5, the pixel P of the display device is arranged in a matrix consisting of a plurality of rows and columns, and each of unit pixels P may consist of sub-pixels of red R, green G and blue B. FIG. 5 exemplifies that three sub-pixels are included in one unit pixel P. However, the number of sub-pixels included in the unit pixel P may vary depending on the display manner. FIG. 5 exemplifies the display device including pixel P arranged in the form of 4×4 matrix. Meanwhile, in each unit pixel P, the areas occupied by sub-pixels of R, G and B are formed to be the same.

The touch screen panel 100 (see FIG. 4) of the touch detection device explained with reference to FIG. 4 is arranged in the top of the display device including the pixel P arranged in the form of matrix. That is, a plurality of sensor pads 110 (see FIG. 4) and a plurality of signal wirings 120 extended from each sensor pad are arranged in the top of the display device.

Since the signal wiring 120 is arranged in the top of the display device, the sub-pixels of R, G and B may be covered by the signal wiring 120, or not. Only a part of areas among the sub-pixels may be covered by the signal wiring 120.

When the signal wiring 120 is not arranged in the top, the light from the pixel P of the display device may be emitted as it is. When the signal wiring 120 is arranged in the top, the light is emitted by penetrating the corresponding signal wiring 120.

With regard to each case where the light is emitted as it is or the light is emitted by penetrating the signal wiring 120, when the light emitted through the unit area is not balanced with the light emitted from the sub-pixels of R, G and B, or characteristics of light emitted from each unit area varies, the difference in the sense of color occurs and leads to the rainbow effect or Moire phenomenon.

In order to prevent this, according to an embodiment of the present invention, the signal wirings 120 are arranged to form a predetermined acute angle with respect to the column direction where the pixels P are arranged. Here, the predetermined acute angle may be determined according to the arrangement of sub-pixels of R, G and B, length of pitch direction of signal wiring 120, and the distance between signal wirings 120 adjacent to each other.

According to this, when setting the unit area arbitrarily, the areas occupied by the sub-pixels of R, G and B may be the same in the unit areas.

Specifically, FIGS. 5(a) to 5(c) exemplifies two unit areas in the display device consisting of a plurality of pixels P. First unit areas A1, B1 and C2 are those where the signal wirings 120 are not arranged in the top, and second unit areas A2, B2 and C1 are those where the signal wirings 120 are arranged in the top. FIGS. 5(a) to 5(c) illustrates an example where the signal wirings 120 are arranged, and this also applies to a case where the sensor pads are arranged. That is, a plurality of first unit areas A1, B1 and C2 may be set in the first area where the sensor pads or signal wirings 120 are arranged. Likewise, a plurality of second unit areas A2, B2 and C1 may be set in the second area where the sensor pads and signal wirings 120 are not arranged.

First, referring to FIG. 5(a), it may be known that a gross area occupied by the sub-pixel R, sub-pixel G and sub-pixel B in the first unit area A1 which does not overlap with the signal wiring 120 is the same, and that a gross area occupied by the sub-pixel R, sub-pixel G and sub-pixel B in the second unit area A2 is the same. Specifically, in the first unit area A1, two sections are occupied by the sub-pixel R, two sections are occupied by the sub-pixel and one section is occupied by the sub-pixel B. The area occupied by the section of two sub-pixels R, the area occupied by the section of two sub-pixels and the area occupied by the section of one sub-pixel B are the same. In the second unit area A2, the same explanation applies. That is, in one unit area A1 and A2, at least two sections may be occupied by each sub-pixel. Accordingly, when the unit pixel P consists of three sub-pixels, at least 4 sub-pixel sections may be formed in the unit area A1 and A2. When summing up the areas of sections with the same properties, the gross area occupied by different properties becomes the same in the unit area A1 and A2.

In other words, the sums of sizes of sub-pixels with the same properties in each of the first unit area A1 and the second unit area A2 are equal. The area of sub-pixel R, the area of sub-pixel G and the area of sub-pixel B may be referred to the area with the same properties.

In the first unit area A1, since the area occupied by any one of sub-pixels among the sub-pixels of R, G and B is not greater or smaller than the other, each of R, G and B colors are uniformly emitted. Likewise, in the second unit area A2, since the area occupied by any one of sub-pixels among the sub-pixels of R, G and B is not greater or smaller than the other, each of R, G and B colors are uniformly emitted by penetrating the signal wiring 120. Specifically, in each of the first unit area A1 and the second unit area A2, quantity of light or luminance emitted from the sub-pixels of R, G and B is uniformly distributed.

Accordingly, the colors are uniformly emitted in any unit area, not biased to any one of R, G and B. Thus, the rainbow effect or Moire phenomenon resulting from the intensive emission (or non-emission) of a specific color of light may be prevented.

Meanwhile, in FIG. 5(a), it is configured that the unit areas A1 and A2 have the same pitch as that of the signal wiring 120 or as the gap between the signal wirings 120, and to have a height corresponding to a first row of the unit pixel P. However, the unit areas A1 and A2 may be specified arbitrarily unlike the above. For example, even if the unit areas A1 and A2 are configured to have the height corresponding to a second row of the unit pixel P in FIG. 5(a), the above explanation also applies. That is, the unit areas A1 and A2 may be properly configured so that quantity of light or luminance emitted from the sub-pixels inside the unit areas may be uniformly distributed.

Next, FIG. 5(b) illustrates an example where the arrangement of sub-pixels of R, G and B is periodically changed in each pixel P. In the example of FIG. 5(b), the arrangement pattern of sub-pixels of R, G and B in each pixel P is regularly changed in the up and down direction, and the arrangement pattern of those sub-pixels becomes the same with a period of three top and bottom pixels P. Additionally, FIG. 5(b) exemplifies that the length of pitch direction of the signal wiring 120 and the distance between the adjacent signal wirings 120 are smaller than those in the example of FIG. 5(a).

In this case, by properly adjusting the angle of signal wiring 120 within the range of 0° to 90° with respect to the column direction of pixel P, light emitted from each unit area B1 and B2 may not be biased to any one of the colors.

Specifically, among the unit areas B1 and B2 illustrated in FIG. 5(b), the areas occupied by the sub-pixels of R, G and B in the first unit area B1 which does not overlap with the signal wiring 120 are the same. Also, the areas occupied by the sub-pixels of R, G and B in the second unit area B2 which overlaps with the signal wiring 120 are the same.

Thus, in any case, when properly adjusting the arrangement angle of the signal wiring 120, the light emitted as it is through each unit area or emitted by penetrating the signal wiring 120 may not be biased to any one of the colors.

In FIG. 5(b), the unit areas B1 and B2 are configured to have the same width as the pitch of signal wiring 120 and as the gap between the signal wirings 120, and to have the height corresponding to a third row of the unit pixel P. However, the unit areas B1 and B2 may be specified arbitrarily unlike the above.

For example, as illustrated in FIG. 5(c), even if the unit areas C1 and C2 are configured to be in a parallelogram shape, with the same base line as the pitch of signal wiring 120 or the gap between the signal wirings, and with the height the same as the width of the unit pixel P, the areas occupied by the sub-pixels of R, G and B in each of the unit areas C1 and C2 become the same.

Meanwhile, the sub-pixels of R, G and B in the display device may be formed in a quadrangle shape as illustrated in FIG. 5, but are not limited thereto and may be formed in various shapes. For example, the sub-pixels of R, G and B in the display device may be a polygon such as a triangle, a diamond, etc. or a circle or an oval, and may be include a straight line and a curved line. Additionally, the areas of the sub-pixels of R, G and B in the display device may be formed differently according to the color. When the display device is a liquid crystal device (LCD), the sub-pixels of R, G and B implement colors by passing light. The light passing through the sub-pixels of R, G and B may differ from each other in quantity of light or luminance depending on the sub-pixels of R, G and B. In order to minimize the difference in quantity of light or luminance per sub-pixel, the areas of sub-pixels of R, G and B may be formed differently. For the same reason, the areas of sub-pixels of R, G and B may be formed differently in a self-luminous display device as well as the LCD. As mentioned above, when the sub-pixels of R, G and B of the display device have various shapes or the areas of each sub-pixel are different from each other, quantity of light or luminance of red, green and blue passing through the sub-pixels of R, G and B may be adjusted to be uniform by arranging the signal wiring 120 to form a predetermined acute angle with respect to the column direction where the pixels P are arranged. That is, it may be construed that the embodiments of the present invention make quantity of light or luminance of red light, green light and blue light finally observed to a user, uniform.

Figure 6:
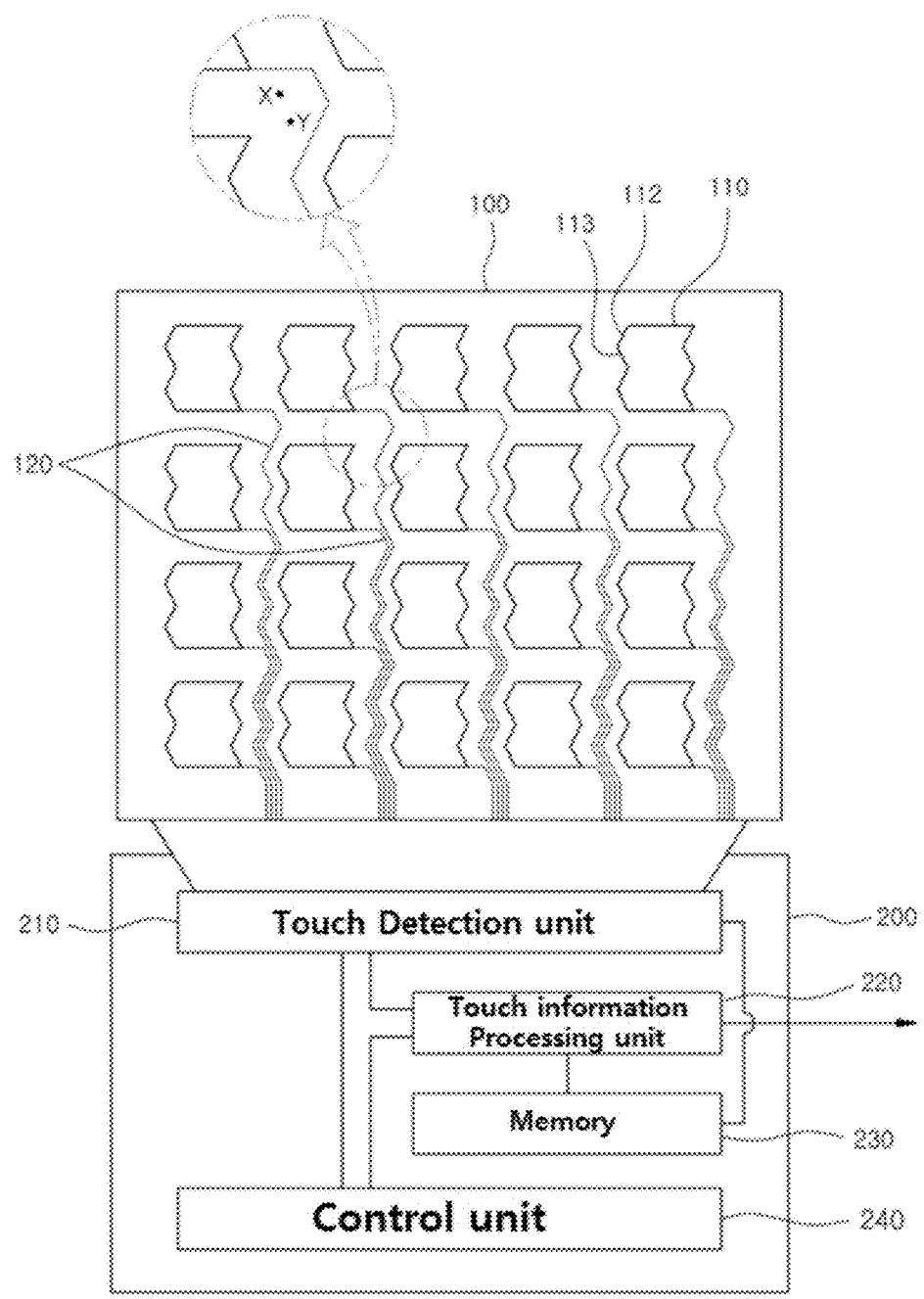
FIG. 6 is an exploded plan view illustrating a touch detection device according to another embodiment of the present invention.

The touch detection device in FIG. 6 includes the driving device 200 that the touch detection device illustrated in FIG. 4 also has. Thus, the contents related thereto are omitted. The sensor pad 110 included in the touch screen panel 100 will be explained.

Referring to FIG. 6, the touch screen panel 100 may include a plurality of sensor pads 110 arranged to form a plurality of rows and columns. The sensor pads 110 may be arranged in a matrix shape to form a plurality of rows and columns, and touch capacitance Ct is formed with a touch input tool, to sense the touch.

One side of the sensor pad 110 includes at least one segment 112 and 113 forming an acute angle with the straight line parallel to the column direction. As mentioned above, the acute angle may be configured differently according to the pixel arrangement.

As illustrated in FIG. 6, at least one segment included in one side of the sensor pad 110 may include a first segment 112 and a second segment 113. The first segment 112 and the second segment 113 meet with each other to form a protruding part 114 (see FIG. 7) to the outside of the sensor pad 110 or a concave part 115 (see FIG. 7) to the inside of the sensor pad 110. Additionally, the first segment 112 and the second segment 113 may have the same acute angle with respect to the straight line parallel to the column direction.

As illustrated in FIG. 6, as an edge of the sensor pad 110 is formed in saw pattern including a plurality of protruding parts and concave parts, the error in determining where a touch occurs on the sensor pads 110 may be reduced.

For example, as illustrated in FIG. 6, when an actual touch point X is formed by a touch generating tool in the center of the areas between four sensor pads 110, the distance from a center of each of the four sensor pads 100 to the actual touch point X lies within the same or similar range. Thus, an equivalent size of touch generating signal may be detected from the four sensor pads 110, and accordingly, a touch detection point Y may also be a center area between the four sensor pads 110.

Figure 2:
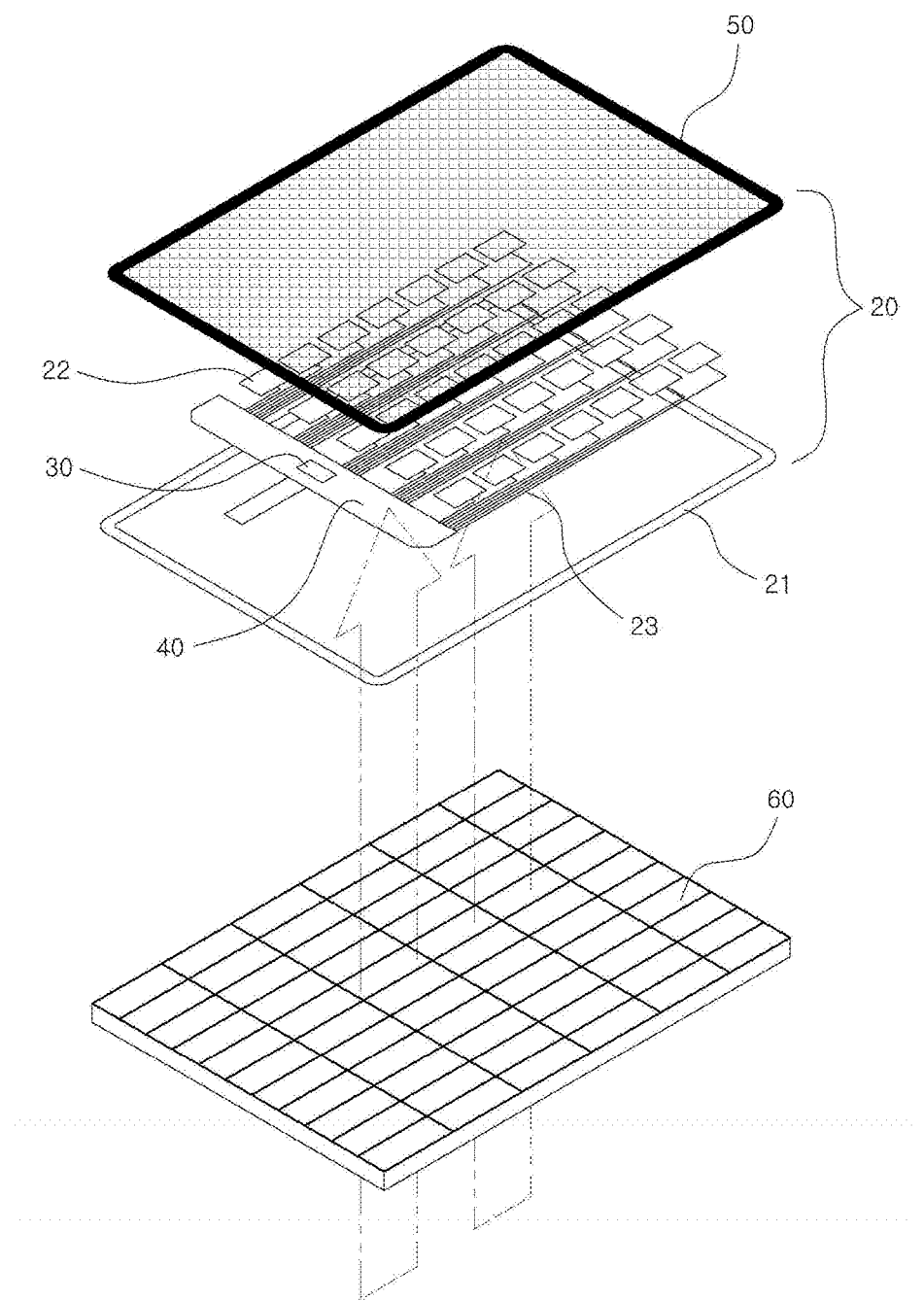
FIG. 2 is an exploded plan view illustrating a conventional touch detection device.
Figure 3:
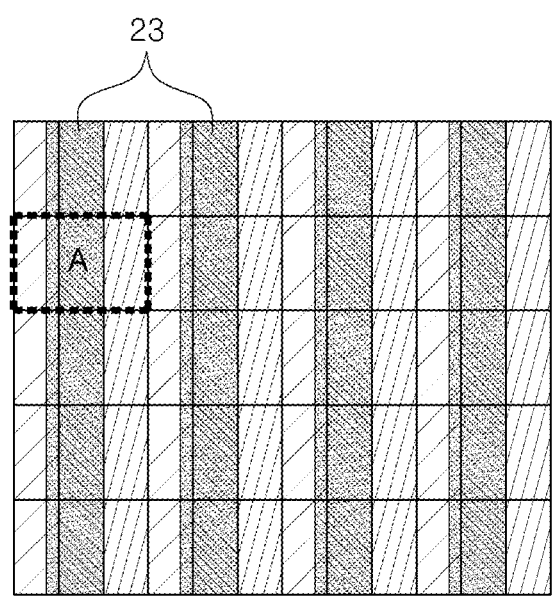
FIG. 3 is an enlarged view illustrating a part of top surface of a conventional touch display device.

That is, according to the embodiment illustrated in FIG. 6, an error between the actual touch point X and the touch detection point Y identified by the touch detection operation may be minimized. Accordingly, even if the driving device of the conventional touch detection device as illustrated in FIG. 2 is used, the touch detection point approximate to the actual touch point may be detected. That is, according to the present embodiment, even if there is no means to reduce the error between the actual touch point X and touch detection point Y, the touch detection point may be accurately detected.

Meanwhile, each of the signal wirings 120 may be extended and bent so as to be parallel to one side of sensor pads adjacent to each other. For example, the signal wiring 120 may have a saw shape repeating the form of being extended with an acute angle so as to be parallel to the protruding part 114 or concave part 115 formed on one side of the sensor pad, and then bent.

Figure 7:
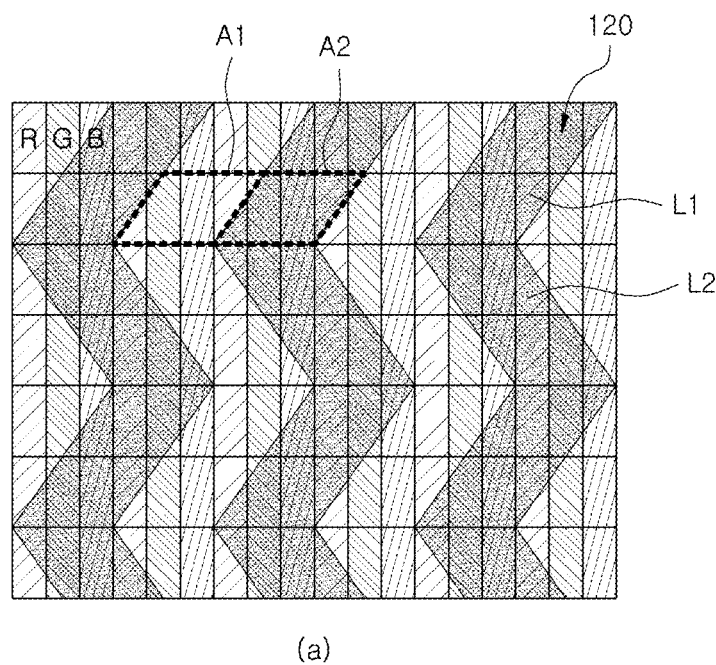
FIG. 7 is a view illustrating a lamination structure of a display device and a touch detection device according to another embodiment of the present invention.
Figure 7:
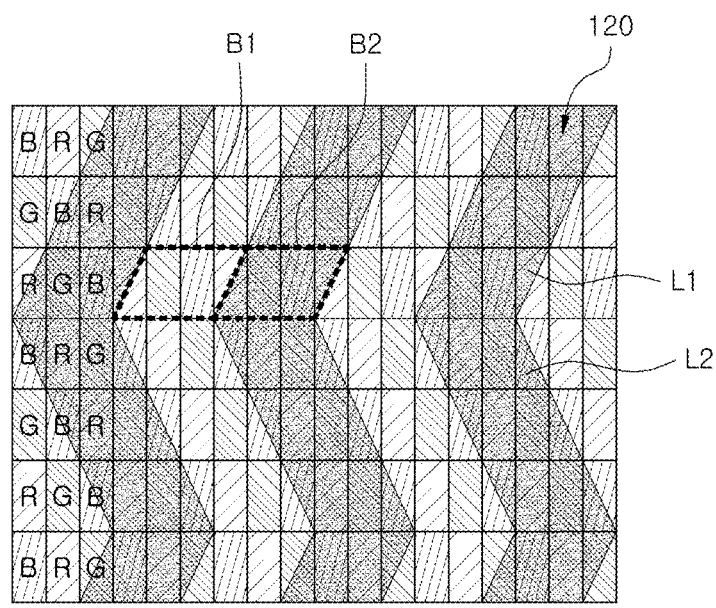

FIG. 7 is a view illustrating the pixel of the display device and signal wiring 120 arranged in the top thereof when the signal wiring 120 has a saw shape.

Referring to FIG. 7, the pixel P of the display device is arranged in a matrix shape forming a plurality of rows and columns. Each of the unit pixel P may consist of sub-pixels of R, G and B. The areas occupied by the sub-pixels of R, G and B in each unit pixel P are formed to be the same.

As mentioned above, the signal wiring 120 may be formed in saw pattern so as to correspond to an outline pattern of the sensor pad 110 (see FIG. 6) which is adjacent to an extension path.

Since this signal wiring 120 is arranged in the top of the display device, light from the sub-pixels of R, G and B may be emitted as it is, or emitted by penetrating the signal wiring 120.

As mentioned above, in each of the cases where the light is emitted as it is or the light is emitted by penetrating the signal wiring 120, when the light emitted through the unit area is not balanced with the light emitted from the sub-pixels of R, G and B, the rainbow effect or Moire phenomenon occurs.

In the embodiment of the present invention, the signal wirings 120 are formed in saw pattern, but the segments L1 and L2 forming the saw pattern are arranged to be at a predetermined acute angle with respect to the column direction where all pixels P are arranged.

According to the above, when configuring the unit area arbitrarily, the areas occupied by the sub-pixels of R, G and B in the unit area become the same.

Specifically, FIGS. 7(a) and 7(b) exemplifies two unit areas in the display device consisting of a plurality of pixels P. The first unit areas A1 and A2 are those where the signal wiring 120 is not arranged in the top, and the second unit areas A2 and B2 are those where the signal wiring 120 is arranged in the top.

First, referring to FIG. 7(a), it may be known that a gross area occupied by the sub-pixel R, sub-pixel G and sub-pixel B in the first unit area A1 which does not overlap with the signal wiring 120 is the same, and that a gross area occupied by the sub-pixel R, sub-pixel G and sub-pixel B in the second unit area A2 is the same.

Since the areas occupied by any one sub-pixel among the sub-pixels of R, G and B are not greater or smaller than the other in the first unit area A1 and the second unit area A2, each color of R, G and B is uniformly emitted. Accordingly, in any unit area, colors may be uniformly emitted, not biased to any one of the colors R, G and B. Additionally, the rainbow effect or Moire phenomenon resulting from the intensive emission (or non-emission) of a specific color of light is removed.

Next, FIG. 7(b) illustrates an example where the arrangement of sub-pixels of R, G and B is periodically changed in each pixel P. In the example of FIG. 7(b), the arrangement pattern of sub-pixels of R, G and B is regularly changed in the up and down direction, and the arrangement pattern of those sub-pixels becomes the same with a period of three top and bottom pixels P.

In this case, by adjusting the angle where the signal wiring 120 is arranged or the length of segments L1 and L2 forming the signal wiring 120 in saw pattern, light emitted from each unit area B1 and B2 may not be biased to any one of the colors. FIG. 7(b) illustrates an example of forming each segment L1 and L2 forming the signal wiring 120 formed in saw pattern to have the length over three pixels P.

According to the adjustment as above, as illustrated in FIG. 7(b), the areas occupied by the sub-pixels of R, G and B in the first unit area B1 which does not overlap with the signal wiring 120 are the same. Likewise, the areas occupied by the sub-pixels of R, G and B in the second unit area B2 which overlaps with the signal wiring 120 become the same.

Thus, in any case, when properly adjusting the arrangement angle of the signal wiring 120 and the form of its pattern, light emitted as it is through each unit area or light emitted by penetrating the signal wiring 120 may not be biased to any one of the colors.

Consequently, when forming the entire section of signal wiring 120 extended from the sensor pad 110 (see FIG. 6) with a predetermined acute angle with respect to the column direction of the pixel P of the display device, light from the sub-pixels of R, G and B emitted through each unit area could be equal.

In FIGS. 7(a) and 7(b), the unit areas A1, A2, B1 and B2 are configured to have the same width as the pitch of the signal wiring 120 or as the gap between the signal wirings 120, and to have the height corresponding to the first row of the unit pixel P. However, the unit areas A1, A2, B1 and B2 may be specified arbitrarily unlike the above.

Figure 8:
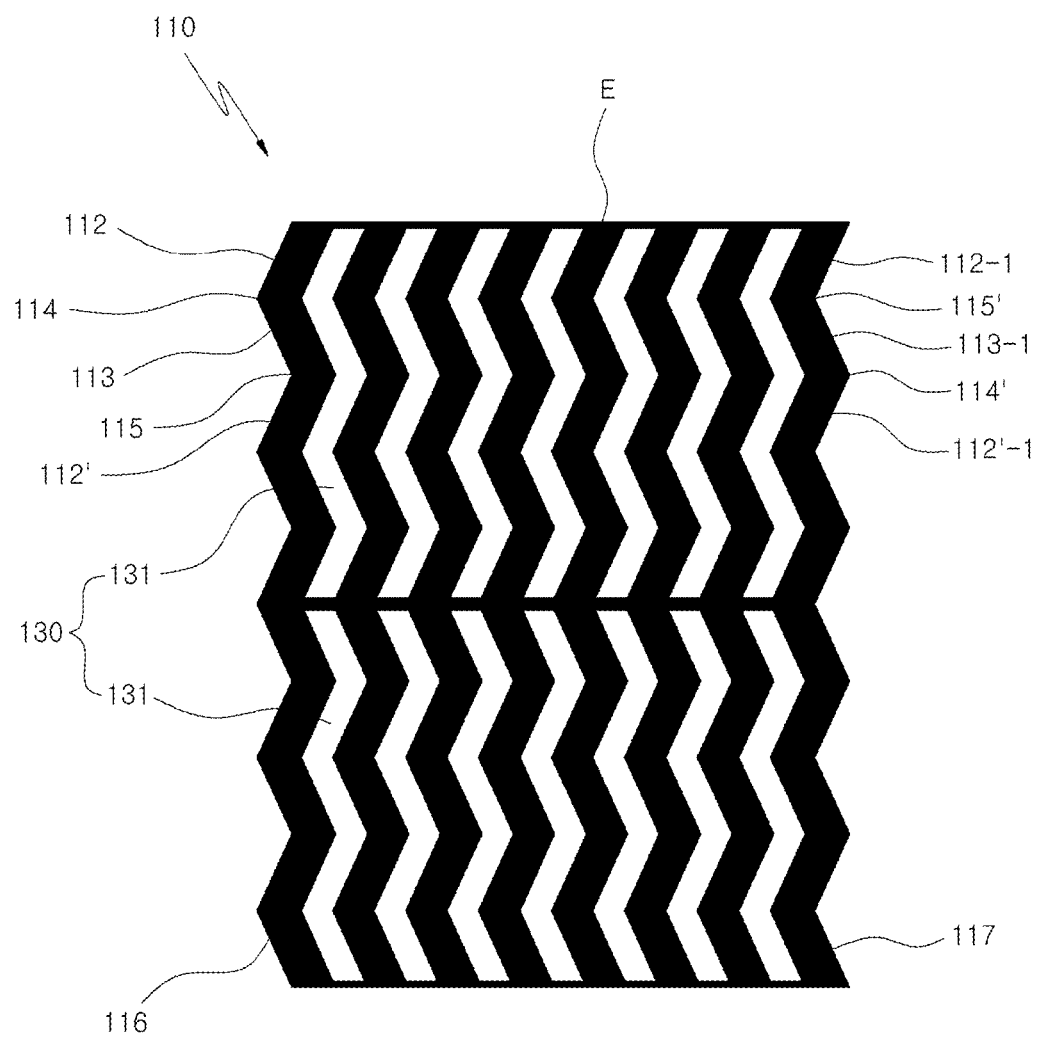
FIG. 8 to FIG. 11 are views illustrating examples where a slit is formed in a sensor pad according to an embodiment of the present invention.

FIG. 8 is a view illustrating an example of sensor pad formed according to an embodiment of the present invention.

One side of the sensor pad 110 includes at least one segment forming an acute angle with a straight line parallel to the column direction. At least one segment may include a first segment 112 and a second segment 113.

One side of the sensor pad 110, which forms a shape where the first segment 112 and the second segment 113 meet with each other, may include a protruding part 114 in a shape protruded to the outside of the sensor pad 110 or a concave part 115 in a concave shape to the inside of the sensor pad 110.

As illustrated in FIG. 8, one side of the sensor pad 110 forms a shape where the first segment 112 and the second segment 114 meet with each other and are bent, accordingly, the protruding part 114 and the concave part 115 may be repeated and may have a saw shape.

For example, when the first segment 112 and the second segment 113 meet with each other and are bent, the protruding part 114 may be formed to the outside of the sensor pad 110. Further, when the first segment 112' and the second segment 113 meet with each other and are bent, the concave part 115 may be formed to the inside of the sensor pad 110. In this case, the first segment 112 and the second segment 113 may have the same acute angle formed with respect to the straight line parallel to the column direction.

Additionally, a first side 116 and a second side 117, which are sides of the sensor pad 110, may have the same form. In this case, the protruding part 114 and concave part 115 formed in the first side 116 and the second side 117 may not be symmetric to each other in the column direction. For example, when the first segment 112 and the second segment 113 of the first side 116 meet with each other and are bent, the protruding part 114 is formed. However, when the first segment 112-1 and the second segment 113-1 of the second side 117 meet with each other and are bent, the concave part 115' is formed. Likewise, when the first segment 112' and the second segment 113 meet with each other and are bent, the concave portion 115 is formed. However, when the first segment 112'-1 and the second segment 113-1 of the second side 117 meet with each other and are bent, the protruding part 114' may be formed. However, the shape, gap, etc. of the protruding part 114 and the concave part 115 are not limited thereto, and may be modified in various embodiments.

Meanwhile, a plurality of slits may be formed in each of the sensor pads 110.

Hereinafter, an example of the slit formed in the sensor pad 110 will be explained. In the present specification, the sensor pad 110 illustrated in FIG. 6 will be explained, but it should be construed that this explanation is not limited thereto, but also applies to the sensor pad 110 illustrated in FIG. 4.

Referring to FIG. 8, as a plurality of slits 130 separated from each other at predetermined intervals are formed in each sensor pad 110, an opening area of the sensor pad 110 increases, thereby improving light transmittance. Additionally, the difference in light transmittance which may occur in a relation between the areas where the signal wiring 120 is formed may be overcome.

Specifically, as the slit 130 is formed in the sensor pad 110, at least part of the pattern within a single sensor pad 110 may be electrically connected to each other, and may have a form where a plurality of electrodes E are arranged with a predetermined pitch. When forming the pitch and formation pattern of the plurality of electrodes E to be the same as those of the signal wiring 120 (see FIG. 6) and furthermore when forming the pitch of the slit 130 to be the same as the gap between the signal wirings 120, the form of pattern between the areas where the sensor pad 110 and signal wiring 120 are closely arranged may be the same. Accordingly, the difference in light transmittance in the areas may be removed.

To this end, the slit 130 may have the same shape (e.g., saw shape) as at least one segment formed in one side of the sensor pad 110. In other words, the slit 130 may be extended and bent in a saw shape in the same manner as the one side of the sensor pad in which the first segment 112 and the second segment 113 meet with each other to form the protruding part or the concave part.

Additionally, the slit 130 is extended in the column direction. At least part thereof is separated to constitute at least two sub-slits 131.

Figure 9:
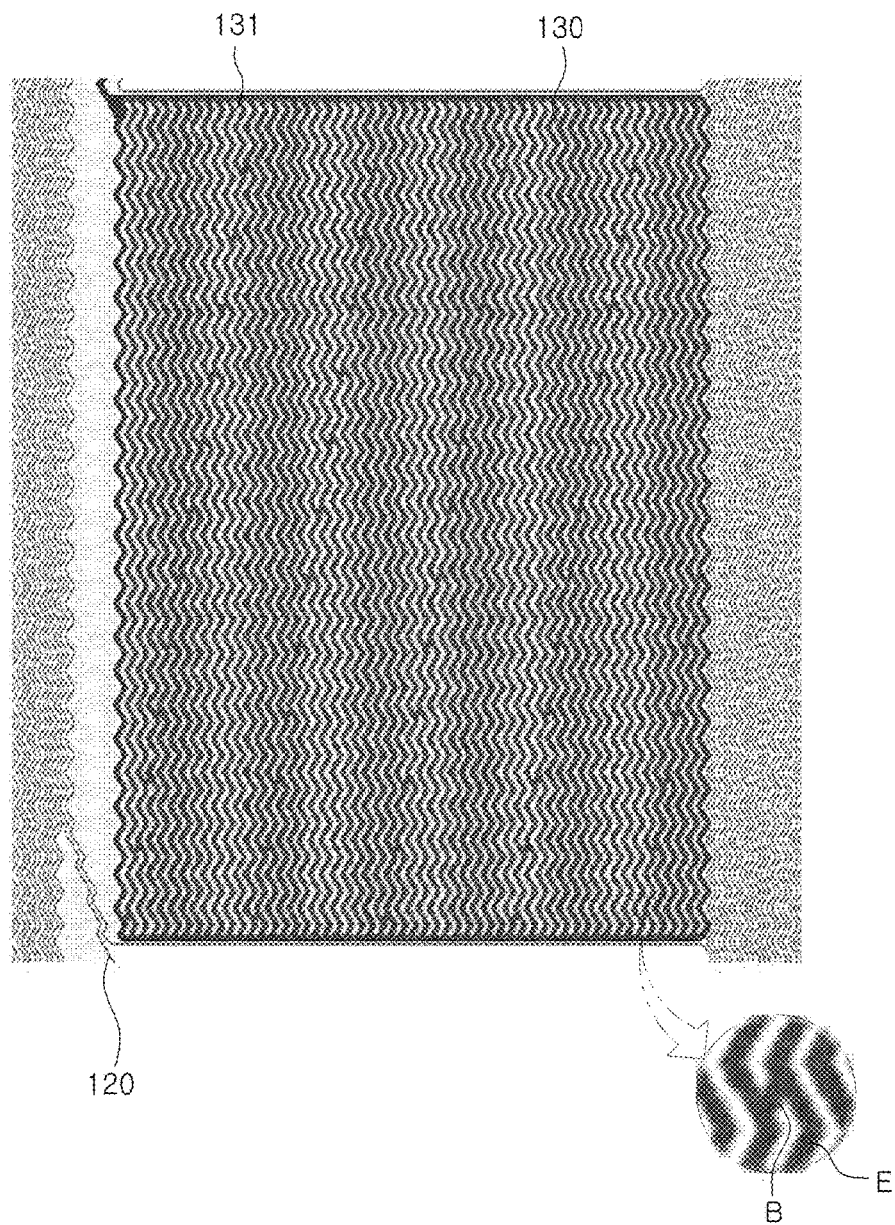

Referring to FIG. 9, the slit 130 may include at least two sub-slits 131 extended and bent in a saw shape in the same manner as the one side of the sensor pad 110. In this case, each of sub-slits 131 adjacent to each other may have different lengths. In other words, a plurality of electrodes E separated by the corresponding sub-slits 131 may be formed to be parallel to each other with the plurality of sub-slits 131 in the single sensor pad 110 as a gap. A part of the plurality of electrodes E adjacent to each other may be electrically connected to each other through a bridge B in at least one point.

A part of the plurality of electrodes E may be damaged by static electricity, etc. generated during manufacturing process or upon operation. Even in this case, the electrodes may be normally operated in terms of the single sensor pad 110 as a whole through the electrodes connected through the bridge B.

Figure 10:
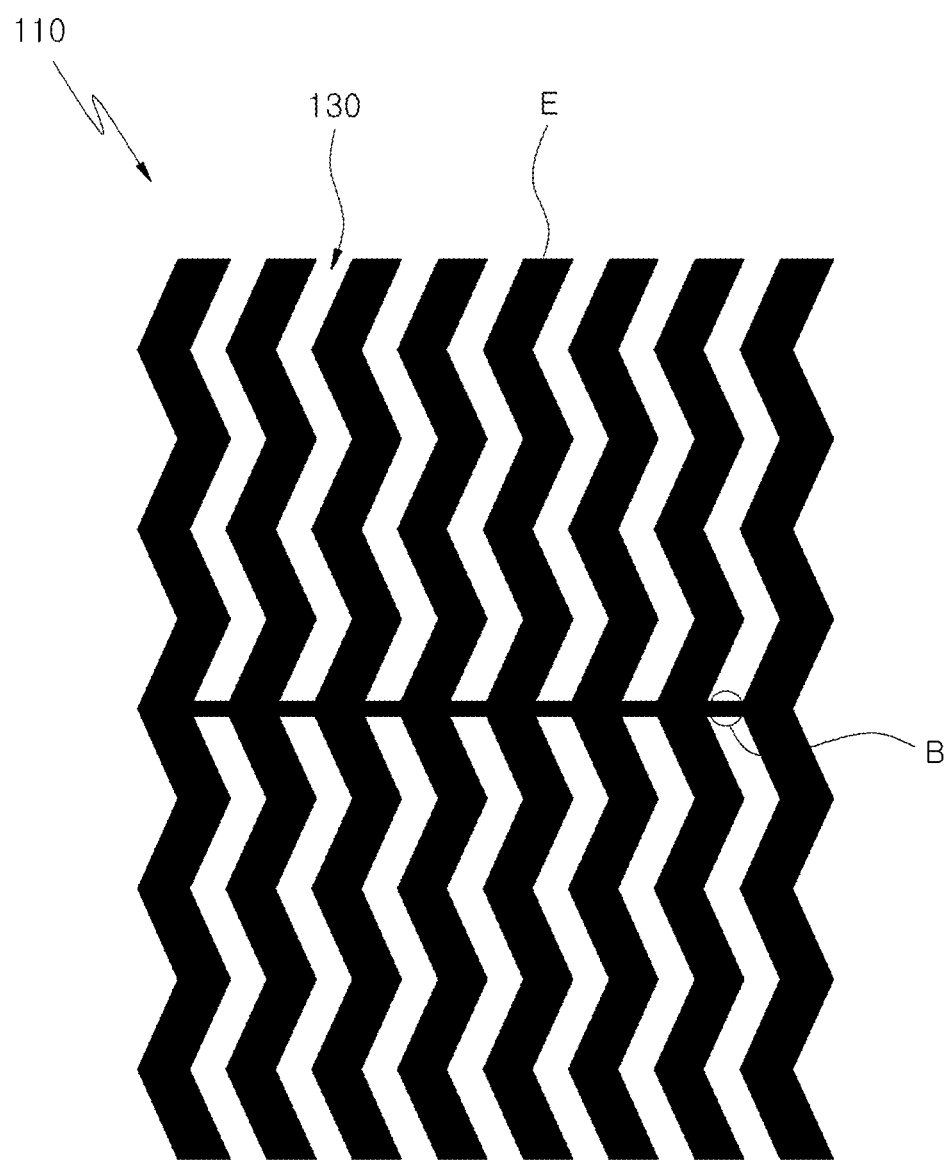

FIG. 10 is a view illustrating an example of sensor pad 110 according to another embodiment of the present invention.

Referring to FIG. 10, the plurality of electrodes E which may be arranged to be parallel to each other with the slit 130 in the sensor pad 110 as the gap may be connected to adjacent electrode E through the bridge B only at one point. FIG. 10 exemplifies that each electrode E is electrically connected through the bridge B passing the center of the sensor pad 110 and extended in the column direction, and that the electrodes E are not connected with each other in the top or bottom of the sensor pad 110.

According to this, the arrangement pattern of electrode E in the single sensor pad 110 becomes closer to the arrangement pattern of the signal wiring 120 illustrated in FIG. 6. Additionally, the difference in light transmittance between the area where the signal wiring 120 is arranged and the area of the sensor pad 110 is minimized, thereby further improving visibility.

Figure 11:
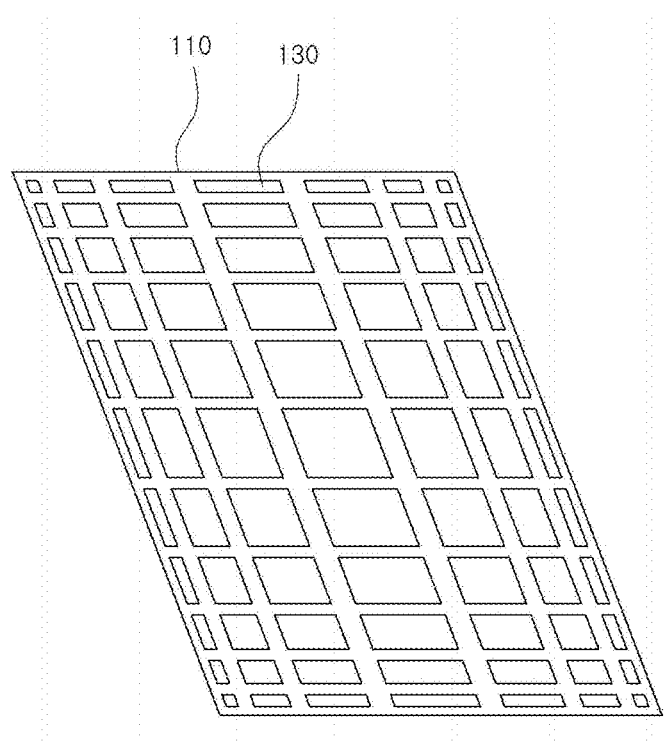

FIG. 11 is a view illustrating the form of sensor pad according to another embodiment of the present invention.

Referring to FIG. 11, the slit 130 in the sensor pad 110 may be formed in a matrix shape forming rows and columns. In this case, the slit 130 may have four sides, and each side may be parallel to the side of the sensor pad 110. The slit 130 may be a quadrangle, have a uniform polygonal form, or have another shape, but is not limited thereto. The form of slit 130 may be modified according to the form of the sensor pad 110.

Each slit 130 becomes smaller or larger as it goes to the edge of sensor pad 110 from the center of the sensor pad 110. FIG. 11 exemplifies that each slit 130 gets smaller as it goes to the side of sensor pad 110 from the center of the sensor pad 110, but is not limited thereto. Each slit 130 may get larger.

That is, the size of slits 130 pass the center point of the sensor pad 110, but may occupy a smaller (or larger) area as the distance from the straight line parallel to the column direction formed by the sensor pad 110 increases. Likewise, the size of slits 130 pass the center point of the sensor pad 110, but may occupy smaller (or larger) area as the distance from the straight line which is parallel to the row direction formed by the sensor pad 110 increases.

The shape, thickness, gap, etc. of the slit 130 in the sensor pad 110 may be modified in various embodiments.

FIG. 11 is an example of forming the slit 130 whose size is changed differentially in the sensor pad 110 illustrated in FIG. 4, but is not limited thereto. Also, the embodiment where the slit 130 whose size increases or decreases differentially even in the sensor pad 110 illustrated in FIG. 6 is formed is possible.

Figure 12:
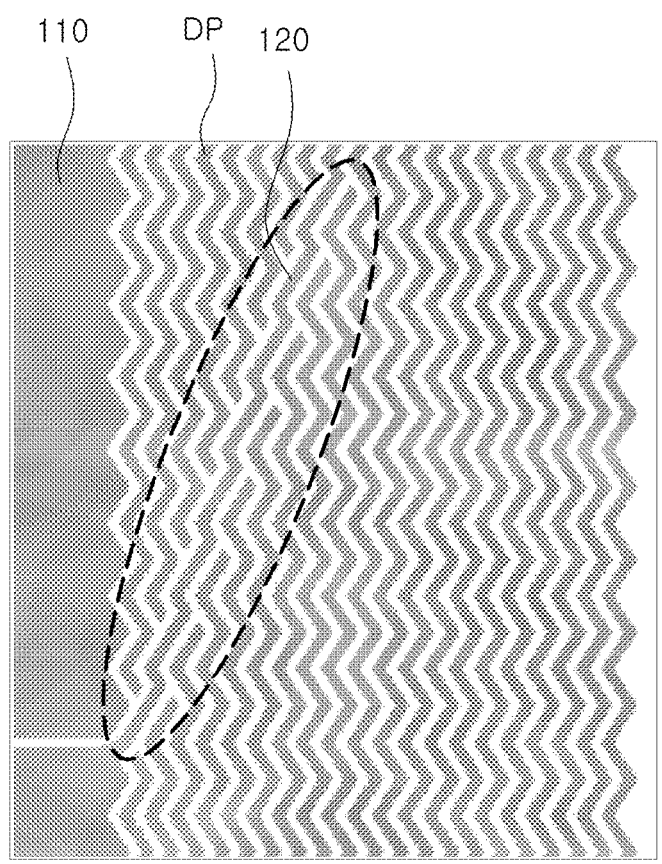
FIG. 12 is a view illustrating a form of signal wiring according to an embodiment of the present invention.

FIG. 12 is a view illustrating the form of signal wiring according to an embodiment of the present invention.

The signal wiring 120 connected to each of the sensor pads 110 may be separated at a predetermined distance in the row direction in the area where the signal wiring is electrically connected to the sensor pad 110 according to the arrangement, etc. of other signal wirings 120, and extended.

Referring to FIG. 12, regardless of through which path the signal wiring 120 is extended and whether the signal wiring 120 connects the sensor pad 110 with the driving device 200 (see FIG. 4), the signal wiring 120 may have a saw pattern from the point of being connected from the sensor pad 110. That is, the signal wiring 120 may be configured to have the same pattern as the signal wirings adjacent to each other from the point of being connected with the sensor pad 110, and one side of the sensor pad 110. Accordingly, the difference in light transmittance is minimized in the area where the entire signal wiring 120 is formed, thereby further improving visibility.

Meanwhile, the number of signal wirings 120 arranged per unit area may be different according to the area. Since one sensor pad 110 is connected to the driving device 200 through one signal wiring 120, the sensor pad 110 which is more adjacent to the driving device 200 would have a great number of signal wirings 120 arranged in the adjacent area.

According to this, light transmittance between the areas may vary depending on the number of arrangement of signal wirings 120 between each area. In order to prevent this, a dummy pattern DP electrode electrically insulated from other constitutional elements may be arranged in the gap between the sensor pad 110 and the signal wiring 120. The dummy pattern DP electrode may have the same pitch and pattern as the signal wiring 120. Additionally, since the dummy pattern DP electrode exhibits the same effect as the arrangement of signal wiring 120 in saw pattern in the corresponding area, the difference in light transmittance would be removed in the entire touch screen panel, accordingly, visibility could be optimized.

According to the present invention, at least one side of the sensor pad 110 and the signal wiring 120 include at least one segment formed to have an acute angle with respect to the longitudinal direction of the pixel of the display device, thereby improving visibility.

Although the exemplary embodiments of the present invention have been disclosed for illustrative purposes, those skilled in the art will appreciate that various modifications, additions and substitutions are possible, without departing from the scope and spirit of the present invention. Therefore, it should be understood that the forgoing description are examples only, and is not intended to limit the present invention. For example, each constituent explained in singular form may be carried out in the form of multiple elements, and likewise, constituents explained as being separate may be integrated.

The scope of the present invention is defined by the following claims, and it is intended that the present invention cover modifications or variations of the present invention provided they come within the scope of the appended claims and their equivalents.

What is claimed is:

1. A touch detection device, comprising:
    a plurality of sensor pads arranged in a plurality of rows and columns and suitable for forming touch capacitance with a touch input tool; and
    a plurality of signal wirings for respectively connecting the plurality of sensor pads to a driving device;
    wherein at least a first sensor pad of the plurality of sensor pads has a first side including a first segment and a second segment that meet one another and form a non-zero angle;
    wherein the first segment of the first side of the first sensor pad forms an acute angle with a straight line parallel to the column direction;
    wherein the second segment of the first side of the first sensor pad forms an acute angle with a straight line parallel to the column direction;
    wherein at least a first signal wiring of the plurality of signal wirings includes a first segment and a second segment that meet one another and form a non-zero angle;
    wherein the first segment of the first signal wiring forms an acute angle with a straight line parallel to the column direction;
    wherein the second segment of the first signal wiring forms an acute angle with a straight line parallel to the column direction;
    wherein the first segment of the first signal wiring is parallel to, and spaced a first distance from, the first segment of the first side of the first sensor pad;
    wherein the second segment of the first signal wiring is parallel to, and spaced a second distance from, the second segment of the first side of the first sensor pad;
    wherein the first distance is substantially equal to the second distance;
    wherein the first sensor pad comprises a plurality of electrodes separated from each other at predetermined intervals by a plurality of slits and forming an acute angle with the straight line; and
    wherein spacing between the first signal wiring and the first sensor pad defined by the first distance and the second distance forms a gap; and
    wherein a pitch of the slits is formed to be the same as a pitch of the gap between the signal wirings.

2. The touch detection device of claim 1, wherein the first segment of the first side of the first sensor pad and the second segment of the first side of the first sensor pad meet with each other to form a protruding part extending towards the outside of the first sensor pad or a concave part extending towards the inside of the first sensor pad.

3. The touch detection device of claim 2, wherein the first segment of the first side of the first sensor pad and the second segment of the first side of the first sensor pad have the same acute angle formed with respect to the straight line parallel to the column direction.

4. The touch detection device of claim 1, wherein areas of the electrodes separated by one or more of the slits in the sensor pad are electrically connected with each other through at least one bridge formed in an area of the sensor pad.

5. The touch detection device of claim 1, wherein the plurality of sensor pads and the plurality of signal wirings are made of transparent conductive materials.

6. The touch detection device of claim 1, wherein the touch detection device is laminated on a display device comprising a plurality of pixels or is arranged inside the display device, and segments of the first signal wiring or the first side of the first sensor pad forming an acute angle with the straight line parallel to the column direction are thereby non-parallel to the longitudinal direction of the pixel.

* * * * *